United States Patent [19]

Iwata

[11] Patent Number: 5,687,168
[45] Date of Patent: Nov. 11, 1997

[54] LINK STATE ROUTING DEVICE IN ATM COMMUNICATION SYSTEM

[75] Inventor: Atsushi Iwata, Tokyo, Japan

[73] Assignee: NEC Corporation, Japan

[21] Appl. No.: 680,678

[22] Filed: Jul. 16, 1996

[30] Foreign Application Priority Data

Jul. 19, 1995 [JP] Japan .................................. 7-182320

[51] Int. Cl.[6] ............................................ H04L 12/28
[52] U.S. Cl. ........................................ 370/255; 370/400
[58] Field of Search .......................... 370/60, 60.1, 94.1, 370/94.2, 94.3, 110.1, 254, 255, 389, 397, 400, 409, 410

[56] References Cited

U.S. PATENT DOCUMENTS

| | | | |
|---|---|---|---|
| 5,265,092 | 11/1993 | Soloway et al. | 370/60 |
| 5,375,167 | 12/1994 | Bales et al. | 379/207 |
| 5,377,262 | 12/1994 | Bales et al. | 379/220 |

OTHER PUBLICATIONS

J. Moy, "OSPF Version 2", Network Working Group, Request for Comments: 1247, Obsoletes: RFC 1131, Jul. 1991, Internet Engineering Task Force (IETF), pp. 20–33.

*Primary Examiner*—Hassan Kizou
*Assistant Examiner*—A. Bnimoussa
*Attorney, Agent, or Firm*—Ostrolenk, Faber, Gerb & Soffen, LLP

[57] ABSTRACT

A link state routing device reduces amount of link state information exchanged in a network irrespective of number of links connecting between adjacent switches. Hello protocol portion detects adjacent switches in the network, to which respective of links are connected. A link abstracted portion obtains an abstracted link by virtually aggregating a plurality of links connected to the same switch, and generates a link state with respect to abstracted link with uniting link state information of a plurality of links. The link state update protocol portion has link topology information synchronized in the network by distributing the abstracted link state information with flooding mechanism. Since the abstracted link represents a plurality of links, information amount to be distributed can be reduced.

10 Claims, 7 Drawing Sheets

LINK STATE ROUTING DEVICE IN ATM COMMUNICATION SYSTEM

BACKGROUND OF THE INVENTION

1. Field of the Invention

The present invention relates generally to a link state routing device in an asynchronous transfer mode (ATM) communication system. More specifically, the invention relates to a link state routing device for selecting an optimal route upon packet transmission in a network, in which communication is performed in asynchronous transfer mode.

2. Description of the Related Art

A large scale communication network includes a plurality of nodes or switch as branching points of transmission routes. These switches are connected by transmission lines for forming a network. If a plurality of physical links or logical links are typically provided between the switches, the amount of information which can be transmitted between the switches could increase.

Therefore, there are a plurality of routes to be taken to reach an intended switch from one switch in the network. Thus, it becomes necessary to determine the switches to pass through for establishing an optimal route. A device for setting the optimal route in the network is a link state routing device. In order to determine the optimal route, it becomes necessary for each link state routing device in each switch to know the connecting condition of the whole network. Hereinafter, the connecting condition between respective switches will be referred to as "link topology".

The link state routing device which has been used conventionally, has been designed to exchange information with respect to all links provided between the switches. The information to be exchanged is connection state of the links, a link cost indicative of communication fee and/or stability of communication and so forth when the link in question is used. The information set forth above will be hereinafter referred to as link state information.

The link state routing device determines a minimum cost route based on link metrics obtained by exchanging of the information, by a predetermined path calculation algorithm. Concerning such link state routing device has been disclosed in Standard Protocol Proposal "OSPF Version 2" for Request for Comments (RFC) 1247 accepted on July, 1991 in Internet Engineering Task Force (IETF).

This technology is a routing protocol to be realized on an internet protocol (IP). On the other hand, the switch (called as "IP router") assigns IP address for both ends of all links provided between the switches and exchanges all of the link costs presenting between the switches.

For example, it is assumed that three physical lines are formed between a first switch and a second switch. Then, the IP address is assigned at respective ends of the three links and exchanging of the link cost is performed per each physical link. On the other hand, in communication of an asynchronous communication mode (ATM), there is a virtually set logical links so that exchange of the link cost has to be performed with respect to the physical links and the logical links.

In such conventional link state routing device, when a plurality of links are present between respective switches, link information indicative of the link costs is exchanged. For this purpose, even when the number of switches is the same, amount of link information to be exchanged is inherently increased as the number of physical and/or logical links connecting these switches increases, so that it takes a longer period for distributing such information.

On the other hand, with respect to all of the links in the network, the link topology information has to be maintained in each switch to make a size of a link state database for storing the link state information huge. Furthermore, even when candidates of the shortest route goes through, they could come out from the switch to different physical or logical output links so that it inherently requires longer period for retrieval of the optimal route.

SUMMARY OF THE INVENTION

Therefore, it is an object of the present invention to provide a link state routing device which can reduce amount of link state information to be exchanged within the network irrespective of number of links connecting adjacent switches.

According to one aspect of the invention, a switching device for forwarding packets based on exchanging exchanged routing information packets transmitted within a communication network arranged at branch points of transmission path of the communication network, comprises:

switching means for forwarding the packets;

neighbor link state registering means for registering neighbor link state information indicative of transmission characteristics of transmission links forming the communication network, with respect to each of the transmission links, to which one end of the switching means is connected;

adjacent switching device detecting means for detecting adjacent switching devices connected to the other end of the transmission link;

abstracted link configuring means for virtually aggregating the transmission links registered in the link state registering means and having the other ends connected to the same switching device, and setting an abstracted link; and abstracted link state distributing means for generating an abstracted link state information representative of transmission characteristics of the abstracted link vertically set on the basis of the link state information with respect to each individual links aggregated as the abstracted link by the abstracted link setting means and distributing the abstracted link state information to all of the over switching devices in the communication network.

In the preferred construction, the transmission link includes a physical link and a logical link. The communication network may be an asynchronous transfer mode network and the logical link is a virtual path.

The adjacent switching device detecting means may include detecting means for detecting switching device connected to respective links when number of transmission link connected to the switching means is varied, and the abstracted link configuration means may perform re-setting of abstracted link on the basis of the result of detection of adjacent switching device detecting means. The abstracted link state distributing means may include means for generating the abstracted link state information of the abstracted link re-configured by the abstracted link configuring means. The abstracted link state distributing means may include means for notifying connecting condition of the abstracted links to all of the other switching devices in the communication network, when connecting condition of the abstracted link set by the abstracted link setting means is varied by varying number of links connected to the switching means.

The abstracted link state distributing means may include re-transmitting means for re-transmitting the abstracted link state information to the other switching devices, to which the abstracted link state information is not reached, when distributed abstracted link state information fails to be reached all of the switching devices in the communication network.

The link state registering means may include an adjacent switch address table corresponding to respective of the abstracted links for registering address of the adjacent switching device connected to the other hand of corresponding abstracted link, and link state table storing the link state information with respect to each individual transmission link forming abstracted link corresponding to respective addresses. The adjacent switch address table and the link state table may be mutually connected by a link state information pointer. The abstracted link state distribution means may distribute content of the adjacent switch address table and the content of the link state table connected by the pointer.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
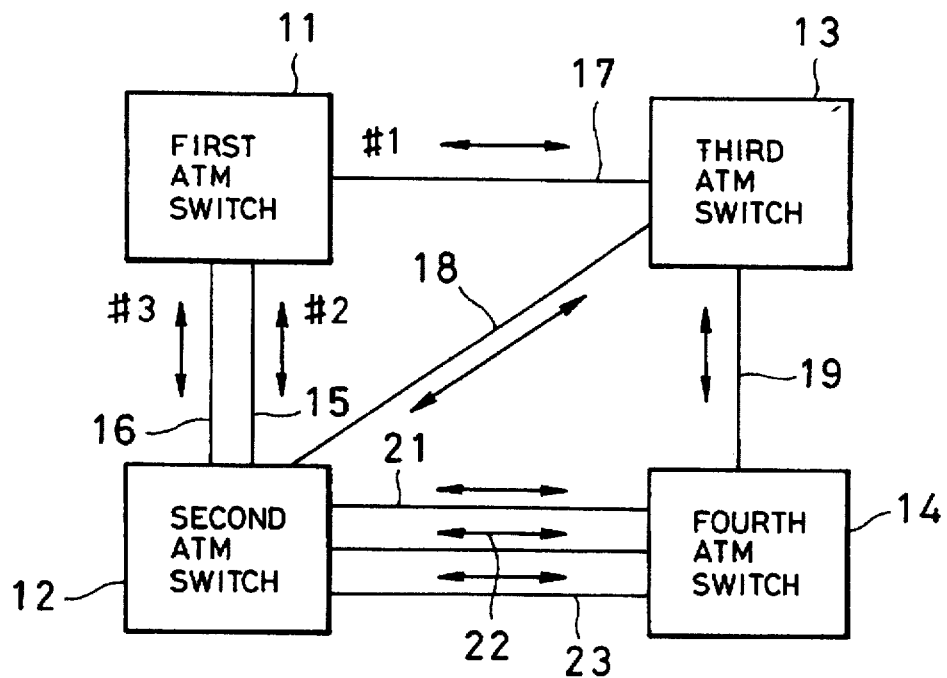
FIG. 1 is an explanatory illustration showing a network device, in which the one embodiment of a conventional link state routing device is arranged in each switch.

FIG. 1 shows a construction of a network system, in which one embodiment of a conventional link state routing device is arranged in each of switches. This network system performs transmission of packets in ATM. The network system includes first to fourth ATM switches 11 to 14 or serving as branch points of transmission routes of packets, and selecting routes for transmission of packets.

The first ATM switch 11 and the second ATM switch 12 are connected through two physical links 15 and 16. On the other hand, the first ATM switch 11 and the third ATM switch 13 are connected through a physical link 17. Similarly, the second and third ATM switches 12 and 13 are connected through a physical link 18. The third and fourth ATM switches 13 and 14 are connected through a physical link 19. Also, the second and fourth ATM switches 12 and 14 are connected through three physical links 21 to 23.

Each ATM switch obtains ATM addresses of the adjacent ATM switches by exchanging Hello packets based on a Hello protocol. The Hello protocol is a transmission procedure employed between the adjacent ATM switches. This procedure, the Hello packet is transmitted and received per the physical link provided between adjacent switches.

In the Hello packet, both ATM address of the own ATM switch and ATM address of the adjacent ATM switch are described. Therefore, it becomes possible to obtain the address of the ATM switch connected to the other end of the physical link, respectively. By this, each ATM switch can recognize neighbor topology between itself and the adjacent switch, namely the connecting condition of each links between adjacent switches.

In the drawings, a solid line with arrows at both ends represents exchanging of Hello protocol control packet between two adjacent switches pointed by the arrows. Also, #1, #2 and #3 indicate link ports of the ATM switch 11.

The link state routing device, according to the present invention, is designed to manage in such a manner that when a plurality of physical links are present between adjacent switches, the physical links are abstracted into one link. Subsequently, the abstracted link will be hereinafter referred to as "abstracted link".

Figure 2:
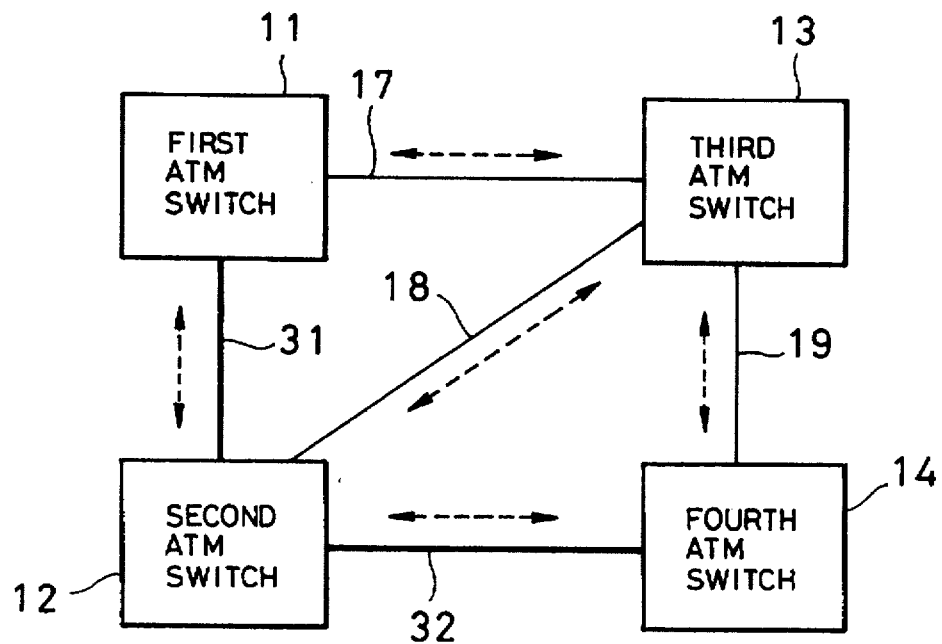
FIG. 2 is an explanatory illustration showing a construction of the network system when sets of physical links shown in FIG. 1 are abstracted.

FIG. 2 shows a construction of the network system in abstracting physical links shown in FIG. 1. Like elements to FIG. 1 are represented by like reference numerals.

Two physical links 15 and 16 provided between first and second ATM switches 11 and 12 in FIG. 1 are abstracted and replaced with one abstracted link 31 in FIG. 2. Similarly, the three physical links 21 to 23 provided between the second and fourth switches 12 and 14 in FIG. 1 are abstracted into an abstracted link 32 in FIG. 2.

In order to manage a whole topology consisting of links and nodes in the overall network system, it becomes necessary for each ATM switch to distribute a neighbor link topology information between adjacent switches to all other ATM switches in the network in flooding mechanism. The neighbor link topology between the adjacent switches can be recognized by exchanging both ATM addresses with Hello packet. When each ATM switch floods physical neighbor link topology between switches to all other ATM switches in the network, problems should be encountered in large amount of information to be noticed.

Therefore, the link state information in a plurality of physical links are represented by information of one abstracted link, and only this abstracted link state information is notified by flooding to all of the switches. The link state information represented by the abstracted link will be referred to as "abstracted-link state information". Transmission of the abstracted link is performed by exchanging a link state update packet based on a link state update protocol.

In the drawing of FIG. 2, the dotted line with arrows at both ends represent exchanging of the link state update packets.

The link connecting between the switches is not only the physical link directly connecting the adjacent switches by means of hardware but also the logical link, such as a virtual path (VP) virtually connecting adjacent switches through several switches by VP tunneling mechanism.

Figure 3:
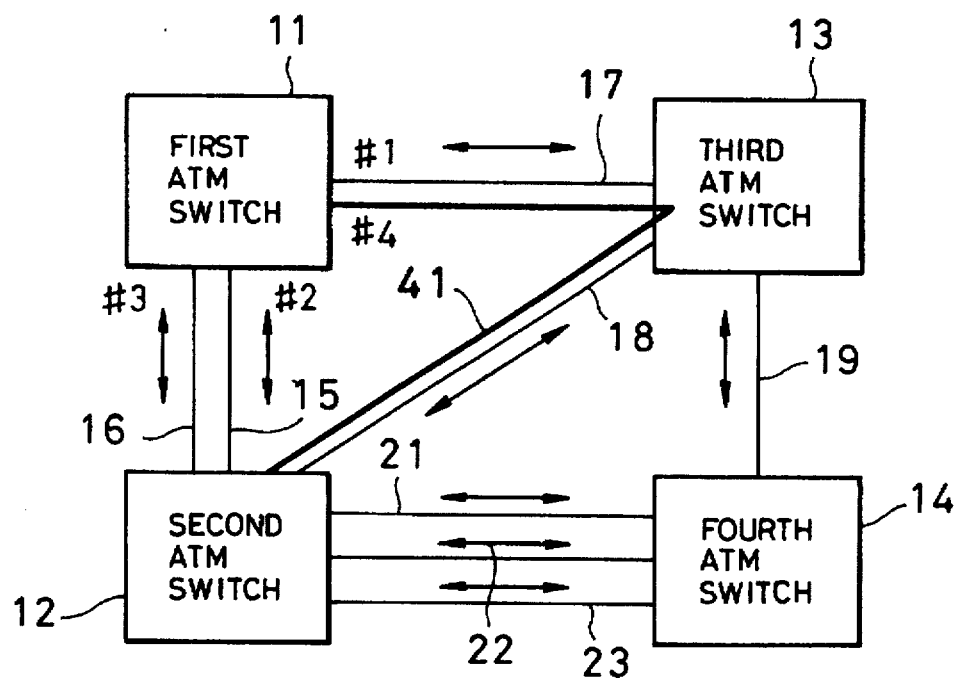
FIG. 3 is an explanatory illustration showing one example of a construction of the network system, in which respective switches are connected by physical links and logical links.

FIG. 3 shows one example of the construction of the network system, in which respective switches are connected by the physical link and the logical link. It should be noted that like elements to FIG. 1 are represented by like reference numerals.

In this network, in addition to the physical links 15 and 23, a logical link 41 connecting the first and second ATM switches 11 and 12 via the third ATM switch 13. Respective ATM switches obtain ATM addresses of adjacent switches by exchanging Hello packets through both of the physical link and the logical link to recognize physical topology and logical topology between itself and the adjacent switch.

Figure 4:
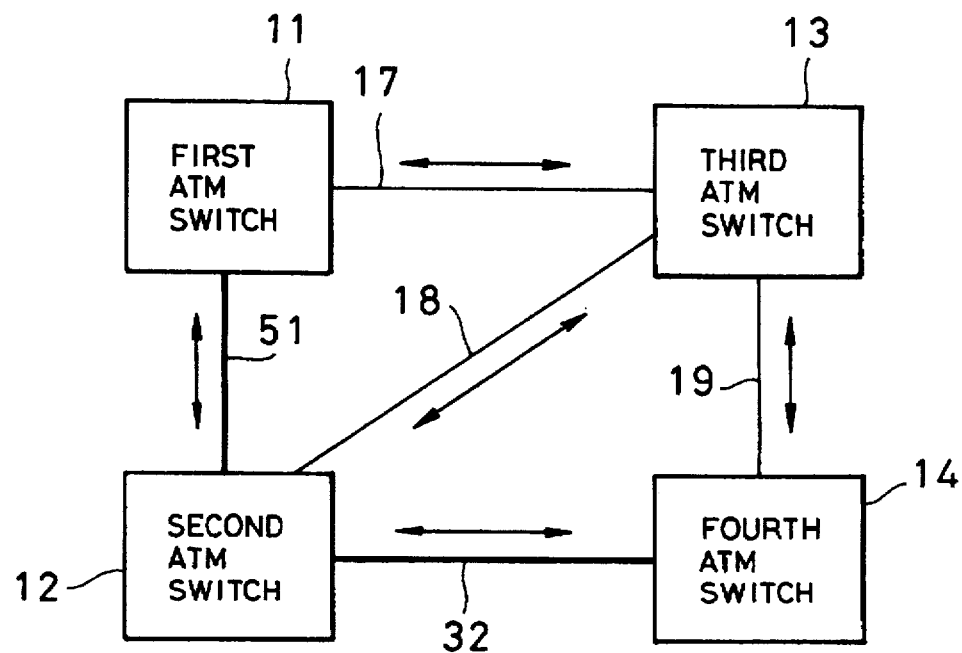
FIG. 4 is an explanatory illustration showing a construction of the network where both of the physical links and the logical links shown in FIG. 3 are abstracted.

FIG. 4 shows the construction of the network system when both of the physical link and the logical link shown in FIG. 3 is abstracted. It should be noted that like elements to FIG. 2 are represented by like reference numerals.

The logical link 41 can be regarded as a link connecting the first ATM switch 11 and the second ATM switch 12 via the third ATM switch 13. Then, abstracted link 51 abstracts three links of the physical links 15 and 16 and the logical link 41 into one abstracted link.

On the other hand, similarly to FIG. 2, between the switches connected by only physical link is also abstracted to be connected by one abstracted link. Therefore, the link state information to be flooded to other switches are expressed by the abstracted link state information based on of these abstracted links. The abstracted link state information is exchanged with adjacent switch and also distributed to all of the other switches by flooding with the link state update packet.

Figure 5:
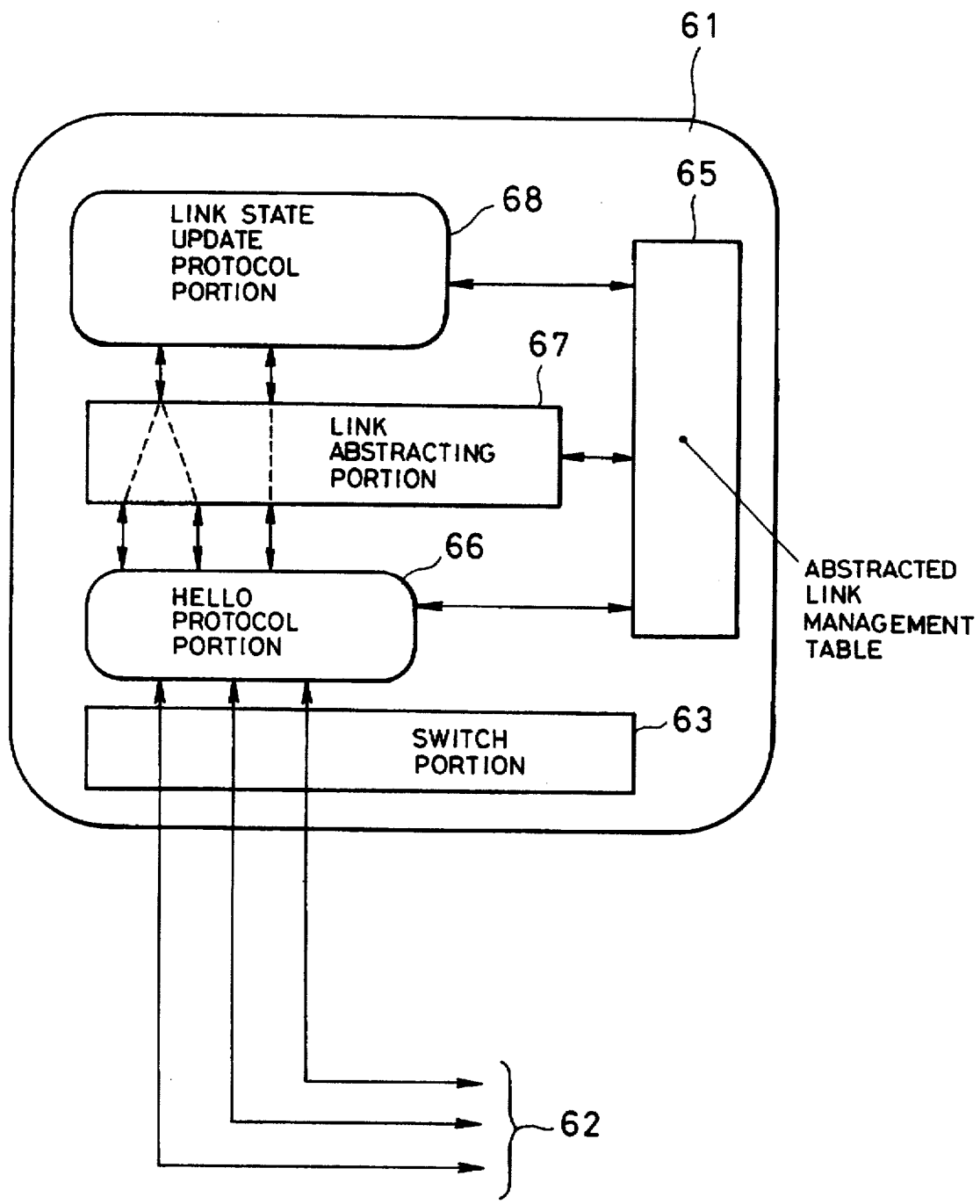
FIG. 5 is a block diagram showing general construction of an ATM switch having the link state routing device.

FIG. 5 shows a general construction of the ATM switch having the link state routing device. The ATM switch 61 has a switch portion 63 connected to adjacent ATM switches through respective physical or logical links 62 for forwarding ATM cells.

A Hello protocol portion 66 exchanges Hello packets between adjacent switches based on a Hello protocol for checking connecting condition of the physical link and the logical link between adjacent switches. By this, the link neighbor topology between adjacent switches can be known.

A link abstracting portion 67 aggregates physical link and the logical link connected to the common adjacent switch into one abstracted link, and notifies an abstracted link state information to a link state update protocol portion 68 described below.

A link state updating protocol portion 68 is a portion distributing the abstracted link state information to all of other ATM switches by flooding mode. Whenever a neighbor link topology is changed due to disconnection of physical link and logical link or due to plugin of new link.

An abstracted link management table 65 is a table for managing information relating to the abstracted links.

The foregoing components are constructed with a central processing unit (CPU), a read-only-memory (ROM) storing programs, various fixed data, a random-access-memory (RAM) serving as working memory, and so forth.

Figure 6:
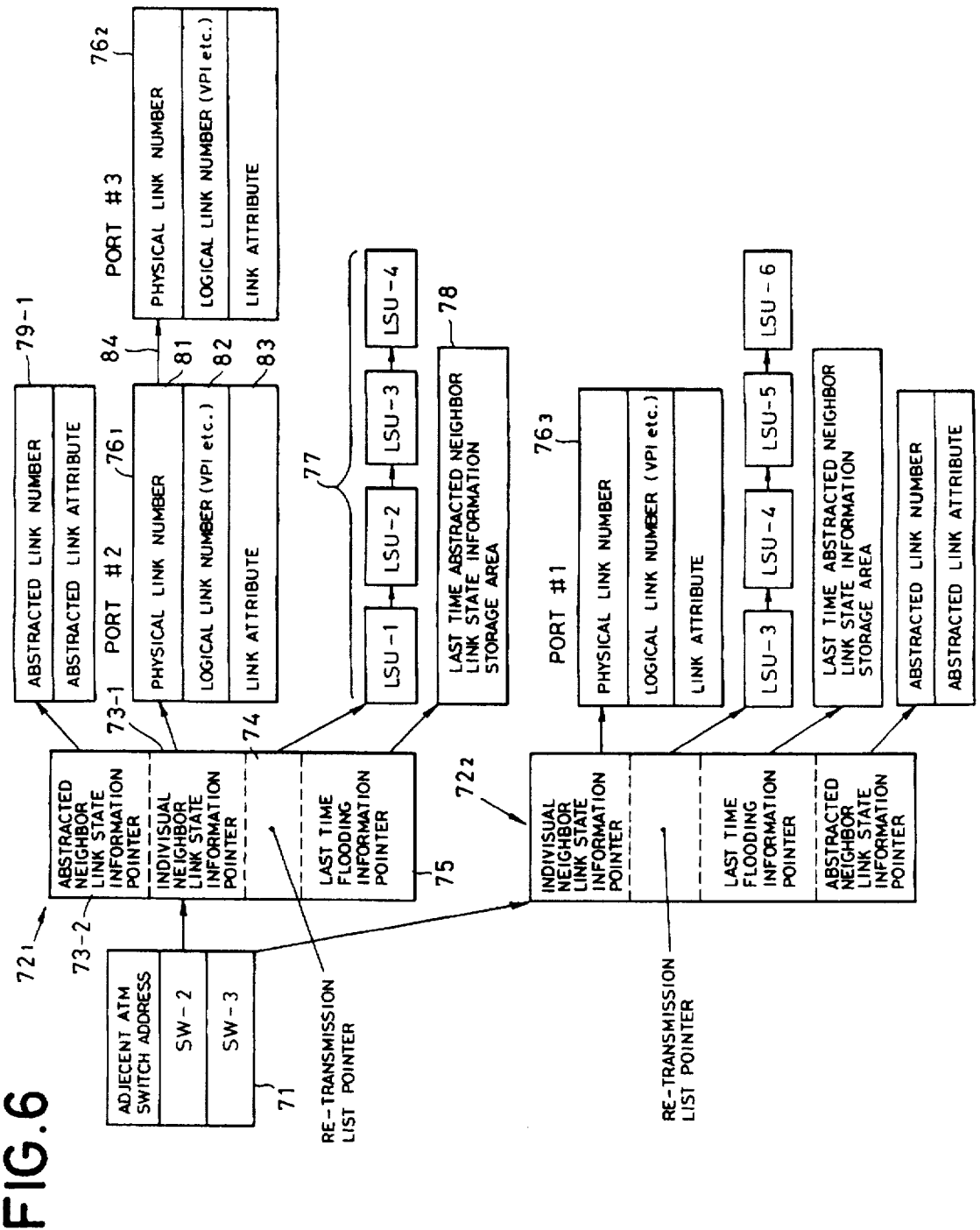
FIG. 6 is an explanatory illustration showing one example of an abstract link management table for managing information relating to an abstract link.

FIG. 6 shows one example of the abstracted link management table 65 for managing information relating to the abstracted links. This table is stored in the predetermined region of the not shown RAM and has a construction connecting a plurality tables with a pointer. In the drawing, there is shown an abstracted link management table included in the first ATM switch 11 in the network shown in FIGS. 2 and 4.

An adjacent ATM switch address table 71 is designed for restoring adjacent ATM switch address recognized by Hello protocol. The adjacent ATM switch address table 71 includes addresses of adjacent switches connected to the other ends of respective of individual physical as well as logical link, and the same addresses are aggregatingly stored as one address. Therefore, all addresses of adjacent ATM switches are stored, not per physical or logical links, but per switches.

On the other hand, in the adjacent ATM switch address table, a pointer information indicative of storage position in the table for managing the abstracted link with correspondence to the address of respective adjacent switch, is registered. In the drawing, this is shown by arrow.

Respective pointers shown in the adjacent ATM switch address table points abstracted link managing pointer tables $72_1$ and $72_2$, in which pointer groups indicative of various tables storing information relating to the abstracted links are registered. The abstracted managing pointer table $72_1$ registers an individual neighbor link state information pointer 73-1, abstracted neighbor link state information pointer 73-2, a re-transmission list pointer 74 and a last time flooding information pointer 75. Amongst, the individual neighbor link state information pointer 73-1 is the pointer indicative of storage position of a link state information registering table $76_1$ registering information relating to the individual physical and logical links connected between adjacent switches.

The re-transmission list pointer 74 is the pointer indicating the top of a re-transmission list 77 registering information for re-transmission of lost link state update packets in order to ensure to deliver every LSU packet to every other ATM switch.

The last time flooding information pointer 75 is the pointer indicating the address where a last time abstracted link state information storage area 78 storing the content of the abstracted link state information which is flooded over the whole network at the last time, is arranged.

The individual neighbor link state information registering table $76_1$ registers information relating to the individual physical or logical link provided between adjacent switches. Amongst, a physical link number 81 is a portion registering an identification number of the physical link. In a logical link number 82, an identification number of the logical link, such as a virtual path identifier (VPI) is registered. A link attribute 83 is a column registering an attribute with respect to each link, such as the link cost, available bandwidth, transmission delay and so forth.

A link cost indicates communication fee incurred as communicated via the physical link or logical link. For example, in case of the logical link, the communication fee should be differentiated considering the distance of transmission, i.e., in the case where communication is established via Tokyo and in the case where communication is established via Osaka, even when the destination is the same. Even such communication fee becomes one of parameters in selecting the optical route, and it is registered as link attribute. The link cost also includes a value indicative of stability of communication. Greater value represents more unstable state of communication. A routing algorithm may select the route so that a total of the link costs of respective link toward the destination can be minimized.

The available bandwidth indicates available vacant capacity, i.e. how many Mega bits (Mbits) being available for communication among a possible maximum transmission capacity of one physical link, assuming that transmission capacity of one physical link is 100 Mbits, for example.

The individual neighbor link state information registering table $76_1$ includes a pointer indicated by arrow 84 in the drawing and is indicative of the storage area of the next individual neighbor link state information registering table $76_2$ with respect to another physical link or logical link connecting the same adjacent switches. The individual neighbor link state information registering tables with respect to each link provided between the same switches are linked structure connected by the pointer.

The abstracted neighbor link state information pointer 73-2 is the pointer indicative of storage position of an abstracted link state information registering table 79-1 registering information relating to the individual abstracted links connected between adjacent switches.

The re-transmission list 77 includes the packet to be re-transmitted upon flooding, to ensure reliability of information transmission. Whenever the link state update (LSU) packet is transmitted from the link state update protocol portion, the LSU packet is transmitted to adjacent ATM switches, and this LSU packet (labeled as LSU in the drawing) is also added to the re-transmission list 77 at the same time.

Then, when an acknowledgment packet for confirming arrival of LSU packet is received from the adjacent switch, the corresponding LSU packet is removed from the re-transmission list. Accordingly, only LSU packets which failed to be transmitted are maintained in the re-transmission list 77. By repeatedly performing re-transmitting until all of the packets are removed from the re-transmission list 77, the LSU packet can be certainly delivered.

It is also possible to distribute the abstracted link state information 79-1, 79-2 a plurality of physical links or logical links provided between the adjacent switch and the own switch. Then, it becomes unnecessary to prepare the re-transmission list per physical or logical link and rather the re-transmission list is provided to perform re-transmission with taking re-transmission list per each adjacent switch.

In the last time abstracted neighbor link state information storage area 78 indicated by the content stored in the last time flooding information pointer 75, the content of the abstracted neighbor link state information which is flooded in the last time, is registered. Comparing this information with the content of the current abstracted neighbor link state information 79-1, such as that the available bandwidth is varied exceeding or equal to a predetermined value of bandwidth, a variation ratio or variation amount of the link state information, such as variation of the available bandwidth exceeding or equal to the predetermined value, can be recognized. Then, on the basis of the variation ratio or variation amount, judgement should be made whether the abstract neighbor link state information 79-1 has to be transmitted or not. On the other hand, the last time abstracted neighbor link state information stored in the link state information storage area 78 is updated every time of flooding.

Figure 7:
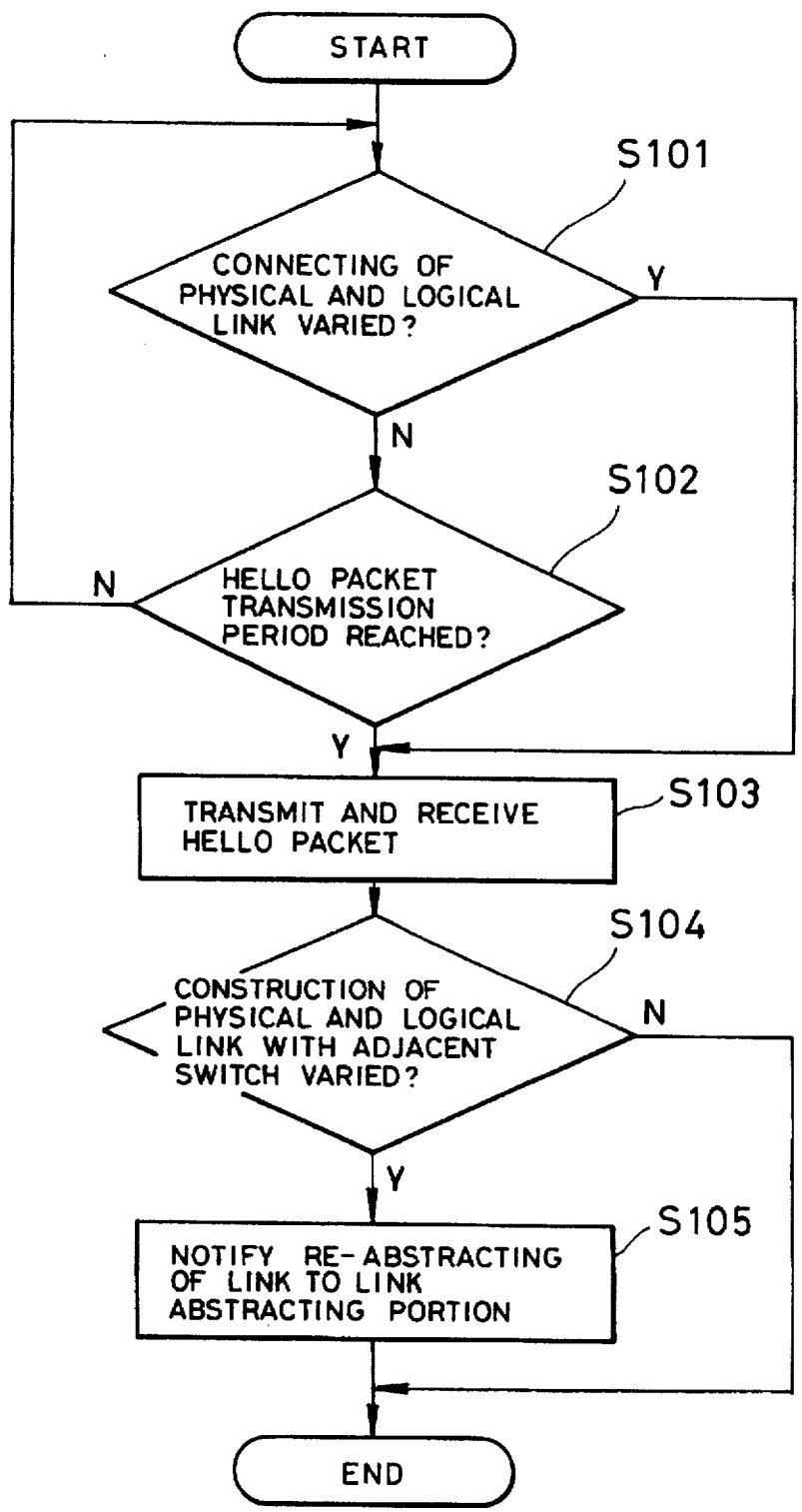
FIG. 7 is a flowchart showing flow of process to be executed by a Hello protocol portion shown in FIG. 5.

FIG. 7 shows flowchart to be executed by the Hello protocol portion 66 shown in FIG. 5. The switch portion 63 is designed to notify a predetermined signal to the Hello protocol portion 66 when the physical link and the logical link in the connected condition is cut off or new link is connected.

The Hello protocol portion 66 monitors whether connecting condition of the links is varied according to cutting off the links or establishment of new links (step S101). If the connecting condition is not varied (step S101: N), check is performed whether a predetermined period for transmitting the Hello packet to the adjacent switch is reached or not (step S102). When transmission period is not reached (step S102: N), the process returns to step S101 to perform monitoring of the connecting condition, again.

When the connecting condition with the adjacent switches is varied (step 101: Y) or when the predetermined transmission period is reached (step S102: Y), exchanging of the Hellow packet is performed with the adjacent switches (step S103). On the basis of ATM address information of both ATM switches contained in the Hello packet, the adjacent ATM switch, to which the own switch is connected, can be recognized.

When number of links to the adjacent switch is varied (step S104: Y), the result of re-abstracting the links is noticed to the link abstracting portion 67 (step 105). When number of links is not increased or decreased (step S104: N), the process goes end without issuing the foregoing notice (END). When the state goes to END, the process goes to START again immediately. This process is constantly repeated.

Figure 8:
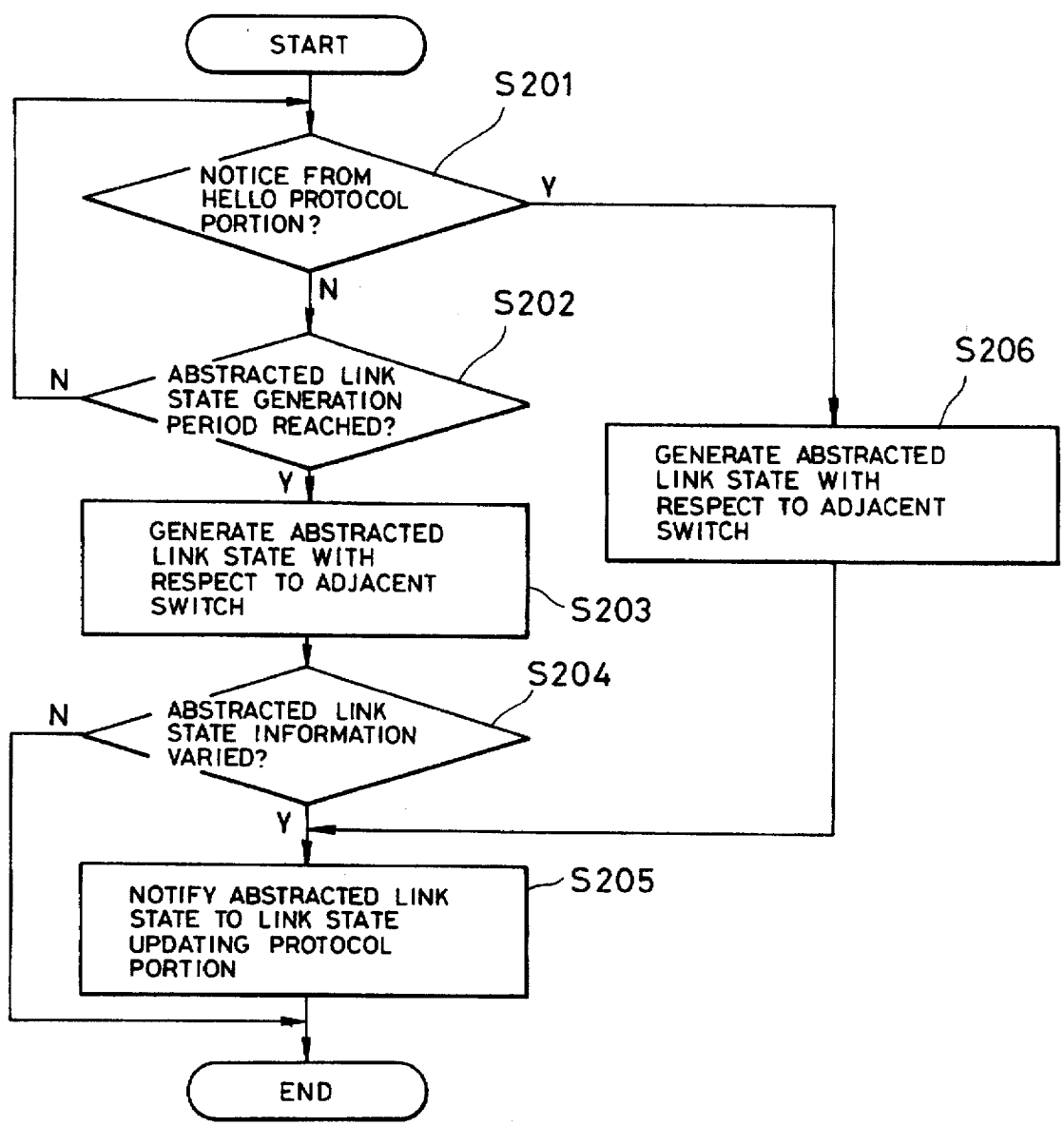
FIG. 8 is a flowchart showing flow of process to be executed by a link abstracting portion.

FIG. 8 shows a flowchart to be performed by the link abstracting portion 67. At first, check is made whether the notice from the Hello protocol portion 66 is arrived or not (step S201). When the notice is not arrived (step S201: N), check is performed whether a predetermined period for generating the abstracted link state information is reached or not (step S202). When the generation period is reached (step 202: Y), the abstracted link state information is generated again (step 203).

The link abstracting portion 67 makes reference to the table shown in FIG. 6 for comprehensively making judgement for attributes of all of the physical links and the logical links between the own switch and the adjacent switches to generate the abstracted link state information.

The attribute of the link contains various factors, such as link cost, bandwidth and, so forth, it is not always possible to perform optimal abstraction satisfying all of traffic characteristics. Therefore, algorithm for abstracting may be varied per traffic characteristics. For instance, when a traffic characteristics for file transmission is required, importance is given for the bandwidth among various attributes to effect abstracting adapted to file transmission with lowering preference of delay.

Next, check is performed whether the generated abstracted link state information causes variation greater than or equal to a given threshold value in comparison with the one in the preceding flooding (step S204). Here, for convenience of explanation, discussion will be given for an example, in which the link state information contains information of bandwidth. When variation of the bandwidth is less than or equal to the threshold value (step S204: N), process goes end (END).

For example, when the bandwidth of the abstracted link is decreased due to link failures of part of parallel links between the adjacent switches, selection of such route that go through the abstracted link may not be appropriate, due to lack of bandwidth. Therefore, for enabling selection of the optimal route, it becomes necessary to notify the fact that the bandwidth of the abstracted link is varied, to all of the ATM switches. In such reason, the link abstracting portion 67 is designed to constantly check variation of the bandwidth.

When variation of the bandwidth is greater than or equal to the threshold value (step S204: Y), the generated abstracted link state information is transferred to the link state update protocol portion 68 (step S205). The information to be transferred is added an identification information indicating whether variation of bandwidth is caused or variation of connecting condition is caused.

Also, when the notice indicative of variation of the connecting condition of the link is arrived from the Hello protocol portion (step S201: Y), the abstracted link state information is generated again (step S206). The link abstracting portion 67 transfers the generated abstracted link state information to the link state update protocol portion 68 (step S205), and then process goes end (END). The Hello protocol portion is designed to perform the shown process repeatedly.

Figure 9:
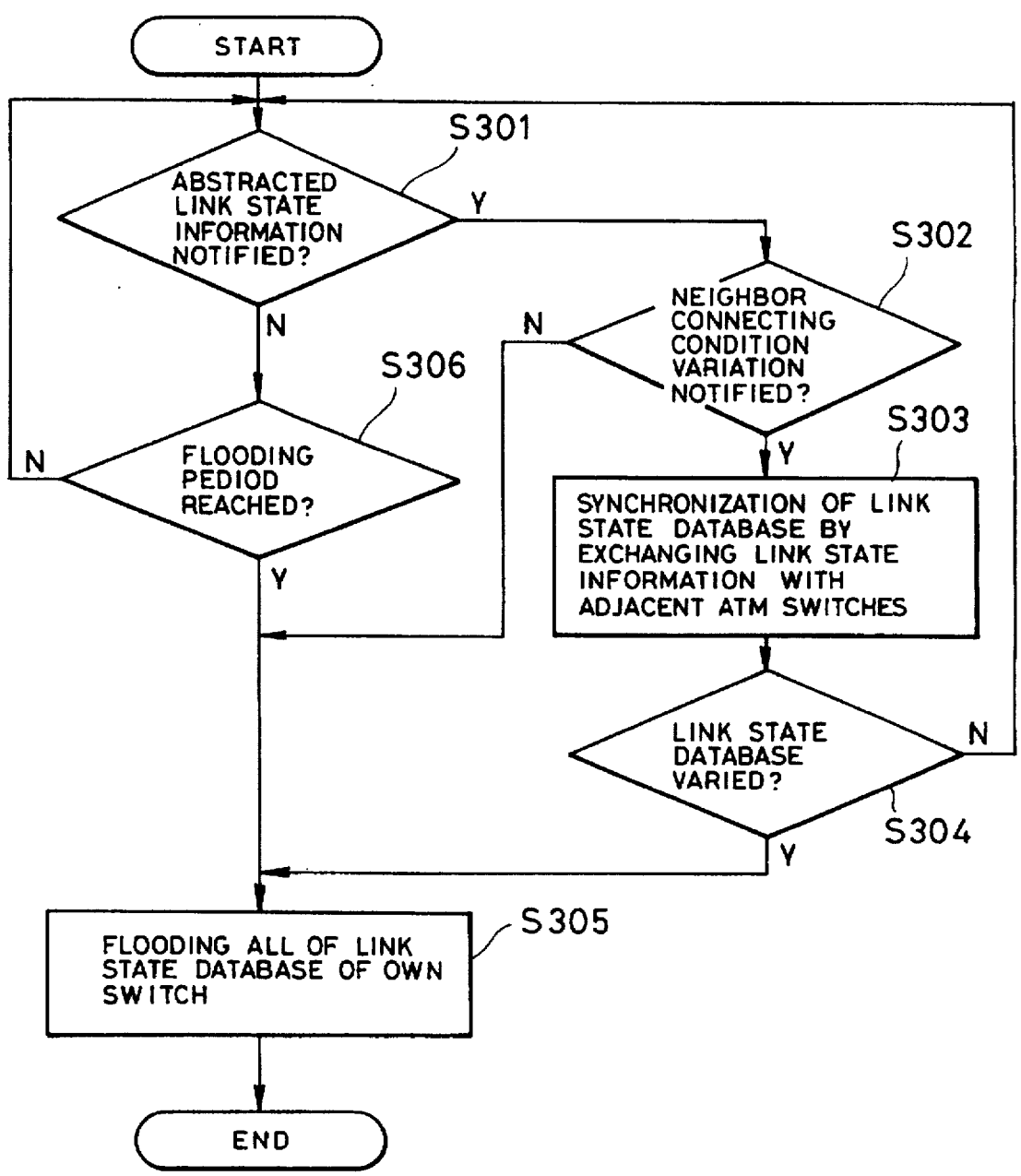
FIG. 9 is a flowchart showing a flow of process to be executed by a link state updating protocol portion.

FIG. 9 shows a flow chart to be executed by the link state update protocol portion 68. The link state update protocol portion performs two functions.

One is a flooding function for issuing notice to all of the ATM switches when the neighbor connecting condition of the link is varied and for distributing the neighbor link topology to all other ATM switches in the network. When the ATM switch receive such flooded packets, it forwards them to adjacent ATM switches, which are expected not to receive such packets yet. Here, the information to be distributed is the neighbor topology, as typically represented by the abstracted link. BY this function, synchronization of the content of the link state database provided in respective switches in the network can be established.

Another function is for an ATM switch to download the link state database already present in the network from the directry adjacent ATM switch. When the ATM switch is newly attached to the existing network (database Synchronization). As set forth above, when the new switch is connected to the existing network, it should take a long period to make the new switch to recognize the existing link database only by flooding. Solving the problem set forth above is the task to be solved by this database synchronization.

The link state update protocol portion 68 checks whether the abstracted link state information is notified from the link abstracting portion 67 (step 301). When the information is obtained from the link abstracting portion (step S301: Y), check is performed whether the connecting condition is varied or the available bandwidth is varied in a magnitude greater than or equal to the threshold value on the basis of the notified abstracted link state information (step S302). When the connecting condition is varied (step S302: Y), the link state information is exchanged between the adjacent switches for establishing synchronizing both the link state databases each other (step S303).

At this time, a method for expressing the abstracted link is to describe by a set of addresses of the switches connected to both ends of the link. For instance, the abstracted link between the first ATM switch 11 and the second ATM switch 12, is expressed by a set of addresses of the first and second ATM switches on the network.

Comparing the content of the link state database exchanged with the adjacent switch with the content of the link state database held in the own switch before exchanging, check is made whether the content is varied or not (step S304).

It should be noted that upon flooding of own link state information, the information is stored in an last time abstracted link state information storage area 78. The last time abstracted link state information can be used for comparing between current information and previous one. If content is not varied (step S304: N), it means that even when the physical or logical link is cut off, the topology of the abstracted link is not varied. At this time, it is not necessary to distribute the link stage database over the whole network. Instead, the process is returned to step S301.

When the content of the link state database is varied (step S304: Y), it becomes necessary to notify this fact to all of the other switches in the network to make the link topology information consistent. Therefore, the content of the link state database owned by the own switch is flooded over all other switches (step S305).

When the notified abstracted link state information shows of the available bandwidth for the abstracted link instead of variation of the connecting condition (step S302: N), the abstracted link state information notified from the link abstracting portion 67 is flooded (step S305). On the other hand, when no notification arrives from the link abstracting portion 67 (step S301: N), check is performed whether a predetermined period set for flooding the abstracted link state information is reached or not (step S306). If the period is not reached (step S306: N), the process is returned to step S301). On the other hand, when the period is reached (step S306: Y), the current abstracted link state information is obtained and flooded to all of the other switches in the network (step S305).

As set forth above, the connecting conditions of respective physical link and the logical link are recognized by the Hello packet, the link state information with respect to all of the neighbor links are registered.

On the other hand, when flooding is performed to all of the other switches in the network, the abstracted link state information when a plurality of links connecting between adjacent switches are represented by one abstracted link, is used as information to be flooded. Therefore, in comparison with the case where the link state information including respective of the physical links and the logical links are flooded, the amount of information to be transmitted can be reduced significantly. As a result, distribution period of the link state information can be shortened. Furthermore, the candidate links for finding the optimal route can be reduced to allow shortening of the path calculation period.

In the embodiment set forth above, while number of switches in the network is four, number of switches can be arbitrarily determined. Also, needless to say, number of physical links and logical links connected between adjacent switches can be determined appropriately.

Also, according to the present invention, when the connecting condition of respective link is varied by cutting off the physical links and the logical link or by adding new link, the abstracted link can be recognized, and its link state information can be updated by flooding mechanism.

By this, the link topology for the abstracted link held by all of the switches in the network can be made consistent.

In addition, according to the present invention, when the abstracted link state fails to be reached to respective switch, re-transmission is performed for the relevant switch, the information is certainly distributed.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encom-

What is claimed is:

1. A switching device for forwarding packets based on exchanging routing information within a communication network arranged at branch points of transmission path of the communication network, comprising:

switching means for forwarding said packets;

neighbor link state registering means for registering neighbor link state information indicative of transmission characteristics of transmission links forming said communication network, with respect to each of said transmission links, to which one end of said switching means is connected;

adjacent switching device detecting means for detecting adjacent switching devices means connected to other ends of those of said transmission links to which said switching means is connected;

abstracted link configuring means for virtually aggregating said transmission links registered in said link state registering means and having the other ends connected to the same switching device, and setting an abstracted link; and abstracted link state distributing means for generating an abstracted link state information representative of transmission characteristics of said abstracted link virtually set on the basis of said link state information with respect to each individual links aggregated as said abstracted link by said abstracted link configuring means and distributing said abstracted link state information to all of other switching devices in said communication network.

2. A switching device as set forth in claim 1, wherein said transmission link includes a physical link and a logical link.

3. A switching device as set forth in claim 2, wherein said communication network is an asynchronous transfer mode network and said logical link is a virtual path.

4. A switching device as set forth in claim 2, wherein said adjacent switching device detecting means includes detecting means for detecting switching device connected to respective links when number of transmission link connected to said switching means is varied, and said abstracted link configuration means performs re-setting of abstracted link on the basis of the result of detection of adjacent switching device detecting means.

5. A switching device as set forth in claim 4, wherein said abstracted link state distributing means includes means for generating said abstracted link state information of said abstracted link re-configured by said abstracted link configuring means.

6. A switching device as set forth in claim 5, wherein said abstracted link state distributing means includes means for notifying connecting condition of said abstracted links to all of the other switching devices in said communication network, when connecting condition of said abstracted link set by said abstracted link setting means is varied by varying number of links connected to said switching means.

7. A switching device as set forth in claim 6, wherein said abstracted link state distributing means includes re-transmitting means for re-transmitting said abstracted link state information to the other switching devices, to which the abstracted link state information fails to be reached, when distributed abstracted link state information is not reached all of the switching devices in said communication network.

8. A switching device as set forth in claim 1, wherein said link state registering means includes an adjacent switch address table corresponding to respective of said abstracted links for registering address of said adjacent switching device connected to the other hand of corresponding abstracted link, and link state table storing said link state information with respect to each individual transmission link forming abstracted link corresponding to respective addresses.

9. A switching device as set forth in claim 8, wherein said adjacent switch address table and said link state table are mutually connected by a link state information pointer.

10. A switching device as set forth in claim 9, wherein said abstracted link state distribution means distributes content of said adjacent switch address table and the content of said link state table connected by said pointer.

* * * * *